United States Patent
Turcotte et al.

(10) Patent No.: US 6,203,719 B1
(45) Date of Patent: *Mar. 20, 2001

(54) EXTENDED ENGINE COOLANT LIFETIME THROUGH POLYMERIC POLYCARBOXYLATE SECONDARY SILICATE STABILIZATION

(75) Inventors: David E. Turcotte, Lexington; Frances E. Lockwood, Georgetown, both of KY (US)

(73) Assignee: Ashland Inc., Lexington, KY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/781,848

(22) Filed: Jan. 10, 1997

(51) Int. Cl.[7] ............................................. C09K 5/00
(52) U.S. Cl. .......................... 252/76; 252/79; 252/396; 252/75
(58) Field of Search ................... 252/76, 79, 75

(56) References Cited

U.S. PATENT DOCUMENTS

| | | | |
|---|---|---|---|
| 4,352,742 | 10/1982 | Davis et al. | 252/75 |
| 4,354,002 * | 10/1982 | Davis et al. | 524/588 |
| 4,362,644 * | 12/1982 | Davis et al. | 252/389 R |
| 4,370,255 * | 1/1983 | Plueddemann | 252/389 A |
| 4,440,721 * | 4/1984 | Wilson et al. | 422/16 |
| 4,548,787 * | 10/1985 | Wilson et al. | 422/15 |
| 4,707,286 | 11/1987 | Carr | 252/75 |
| 5,288,419 * | 2/1994 | Turcotte et al. | 252/76 |
| 5,290,467 * | 3/1994 | Turcotte et al. | 252/76 |
| 5,290,468 * | 3/1994 | Turcotte et al. | 252/76 |
| 5,290,469 * | 3/1994 | Turcotte et al. | 252/76 |
| 5,320,771 * | 6/1994 | Turcotte et al. | 252/76 |
| 5,330,670 * | 7/1994 | Turcotte et al. | 252/76 |
| 5,702,631 * | 12/1997 | Conville et al. | 252/76 |

OTHER PUBLICATIONS

B. F Goodrich MSDS sheet for GOOD–RITE K–700 Polyacrylates; Apr. 1994.
B. F. Goodrich MSDS Sheets (1–6) for GOOD–RITE K–752 Polyacrylate; Apr. 1994.
B. F. Goodrich MSDS Sheets (1–6) for GOOD–RITE K–732 Polyacrylates.
BASF Corporation Product Specification Sheets for SOKALAN CP and PM Copolymeri Carboxylate dispersants, pp. 1–2.

* cited by examiner

Primary Examiner—Necholus Ogden
(74) Attorney, Agent, or Firm—Carrithers Law Ofiice; David W. Carrithers

(57) ABSTRACT

The present invention provides corrosion inhibition formulations and compositions for inhibiting mineral scale and the corrosion of metals particularly the cavitation corrosion of aluminum in the presence of aqueous liquids. The combination of a mixture of polymeric polycarboxylates, azoles, nitrate salts, phosphates, stabilized silicates and transition metal compounds provide a synergistic protective effect against the cavitation corrosion of aluminum in aqueous liquids reducing the corrosion rate and is effective at relatively low concentrations and varying pH ranges. The addition of selected polymeric polycarboxylates not only significantly reduces glycol based coolant cavitation erosion-corrosion, heat rejecting aluminum corrosion, and hard water precipitates and scale, it has been discovered that polymeric polycarboxylates in combination with siloxane stabilized silicates enhance secondary silicate stabilization leading to improvement in aluminum corrosion protection and coolant life when utilized with selected amounts of the above-identified additives. The formulations are particularly suitable for automotive applications.

48 Claims, 4 Drawing Sheets

EXTENDED ENGINE COOLANT LIFETIME THROUGH POLYMERIC POLYCARBOXYLATE SECONDARY SILICATE STABILIZATION

FIELD OF THE INVENTION

This invention relates to an antifreeze formulation for inhibition and prevention erosion and corrosion of aluminum and the corrosion of other metals exposed to an aqueous liquid in automotive coolant systems. The formulation further inhibits mineral scale.

The novel antifreeze formulation comprises a mixture of polymeric polycarboxylates, azoles, nitrate salts, phosphates, siloxane stabilized silicates and transition metal compounds which provide a synergistic protective effect against the cavitation corrosion of aluminum in aqueous liquids reducing the corrosion rate and is effective at relatively low concentrations and varying pH ranges. The addition of selected polymeric polycarboxylates not only significantly reduces glycol based coolant cavitation erosion-corrosion, heat rejecting aluminum corrosion, and hard water precipitates and scale, it has been discovered that selected polymeric polycarboxylates in combination with siloxane stabilized silicates enhance secondary silicate stabilization leading to improvement in aluminum corrosion protection and coolant life when utilized with selected amounts of the above-identified additives. The formulations are particularly suitable for automotive applications.

DESCRIPTION OF THE PRIOR ART

Antifreeze/coolant technology traditionally use silicate as a corrosion inhibitor. Silicates are particularly useful in protecting aluminum automotive cooling system components. The silicate corrosion inhibitors generally also use a phosphate, usually in the form of an alkali metal salt, to help protect metal cooling system parts and also as a buffer to control the pH of the coolant. Often phosphate salts are used to help maintain a stable alkaline environment from which multiple corrosion inhibitors can most effectively function.

Traditionally antifreeze/coolant is sold at nearly one-hundred percent glycol content. This concentrated packaging allows for flexibility so that the user can dilute the antifreeze/coolant, as needed, with available water to obtain the required freeze/boil protection. However, corrosion protection is needed over the entire dilution range.

In modern automotive engineering, many engine components are fabricated from aluminum. Engine coolants, primarily ethylene glycol or propylene glycol based solutions, must transfer heat from operating aluminum engines while inhibiting corrosion. Older automotive engines did not have aluminum components and thus, the traditional antifreeze/coolant compositions may produce corrosion in heat rejecting aluminum or aluminum alloy components. The cavitation erosion-corrosion of aluminum water pumps upon exposure to aqueous systems such as water-cooled internal combustion engine coolants is a relatively new development.

U.S. Pat. No. 4,548,787 discloses the use of a combination water soluble phosphate with tungstae, selenate and molydate for protection against cavitation erosion-corrosion on aluminum. U.S. Pat. No. 4,404,113 discloses the use of polyhydric alcohols as corrosion inhibiting and cavitation reducing additives for coolants.

Certain polycarboxylate type materials have been disclosed for prevention of precipitates in antifreeze/coolant compositions. For example, U.S. Pat. No. 3,663,448 discloses scale inhibition for industrial cooling waters using amino phosphonate and polyacrylic acid compounds, U.S. Pat. No. 3,948,792 discloses an aqueous additive mixture to reduce and modify the amount of silicate scale formed in automotive cooling systems.

U.S. Pat. No 4,487,712 discloses the use of polyacrylic acid as a silicate stabilizer to inhibit gelation which is a silicate depletion mechanism which can occur separately from hard water precipitates.

The addition of polymeric polycarboxylates has been shown to significantly reduce glycol based coolant cavitation erosion-corrosion as set forth in U.S. Pat. Nos. 5,288,419 and 5,290,469; to reduce heat rejecting aluminum corrosion as set forth in U.S. Pat. Nos. 5,320,670 and 5,290,467; and to reduce hard water precipitates and scale as set forth in U.S. Pat. Nos. 5,330,670 and 5,290,468; all of which are hereby incorporated by reference.

U.S. Pat. No. 4,440,721, hereby incorporated by reference, discloses the combination of a water-soluble phosphate with a water soluble molybdate, tungstate, or selenate for providing a protective effect against the cavitation corrosion of aluminum in aqueous liquids. While alkali metal molybdates and the soluble salts of tungstic and selenic acids have been used in antifreeze compositions to prevent the corrosion of metals, particularly cast iron, soluble salts of molybdic, tungstic and selenic acids act to retard the corrosion of aluminum, particularly the cavitation erosion-corrosion of aluminum water pumps.

None of the above references provide a means for obtaining a long life silicate based antifreeze composition as does Applicant's present invention. The combination of a selected polymeric polycarboxylates, azoles, nitrate salts, phosphates, stabilized silicates and transition metal compounds provide a synergistic protective effect against the cavitation corrosion of aluminum in aqueous liquids reducing the corrosion rate and is effective at relatively low concentrations and varying pH ranges. The addition of selected polymeric polycarboxylates not only significantly reduces glycol based coolant cavitation erosion-corrosion, heat rejecting aluminum corrosion, and hard water precipitates and scale, it has been discovered that utilization of selected polymeric polycarboxylates in combination with certain additives enhance secondary silicate stabilization leading to improvement in aluminum corrosion protection and coolant life.

Moreover, such a formulation would be designed for modern aluminum engine based passenger car cooling systems. The formulation must be liquid, easily miscible with diluted antifreeze in the cooling system, protect all cooling system metals, have a useful shelf life, not harm automotive finishes or paint and not promote excessive cooling system foam.

SUMMARY OF THE INVENTION

The present invention has met the above-described need by providing an antifreeze/coolant composition using selected polymeric polycarboxylate additives which reduce corrosion over the entire dilution range without creating precipitates. This composition is soluble in water, alcohol, and alcohol/water mixtures, is compatible with other commonly used antifreeze/coolant components, does not corrode or damage automotive cooling systems and is effective at relatively low concentrations. In addition, the present corrosion inhibition formulations are effective in reducing corrosion in the entire range of cooling system metals, including heat rejecting aluminum, aluminum alloys, copper, steel, cast iron, brass, solder and the like.

It his been found that water-soluble salts of an acid elected from the group consisting or molybdic, tungstic and selenic acids or salts thereof, in combination with a water-soluble phosphate and a polymeric polycarboxylate provide a synergistic improvement in the retardation or the cavitation erosion-corrosion of aluminum water pumps and other metal engine components when used in contact with aqueous liquids, particularly aqueous antifreeze compositions containing a water-soluble alcohol freezing point depressant.

It is an object of the present invention to provide corrosion inhibition formulations for antifreeze/coolant compositions with selected polymeric polycarboxylate additives for reducing glycol based coolant cavitation erosion-corrosion.

It is another object of the present invention to provide corrosion inhibition formulations for antifreeze/coolant compositions with selected polymeric polycarboxylate additives for enhancing silicate stability providing an improvement in coolant life.

It is another object of the present invention to provide corrosion inhibition formulations which reduce corrosion over the entire dilution range of antifreeze/coolant compositions without creating precipitates.

It is an additional object of the present invention to provide corrosion inhibition formulations which are effective in reducing corrosion in the entire range of cooling system metals.

It is an additional object of the present invention to provide corrosion inhibition formulations which are effective in reducing heat rejecting aluminum corrosion.

It is an additional object of the present invention to provide corrosion inhibition formulations which are effective in reducing hard water precipitates and scale.

It is a further object of the present invention to provide corrosion inhibition formulations which are soluble in alcohol, alcohol/water mixtures and water alone.

It is an object of the present invention to provide corrosion inhibition formulations which are compatible with commonly used antifreeze/coolant components.

It is another object of the present invention to provide corrosion inhibition formulations which are effective at relatively low concentrations.

It is an additional object of the present invention to use polymeric polycarboxylates in the corrosion inhibition formulations to reduce the corrosion.

These and other objects of the present invention will be more fully understood from the following description of the invention.

BRIEF DESCRIPTION OF THE DRAWINGS

A better understanding of the present invention will be had upon reference to the following description in conjunction with the accompanying drawings in which like numerals refer to like parts throughout the several views and wherein.

DESCRIPTION OF THE PREFERRED EMBODIMENT

Figure 1:
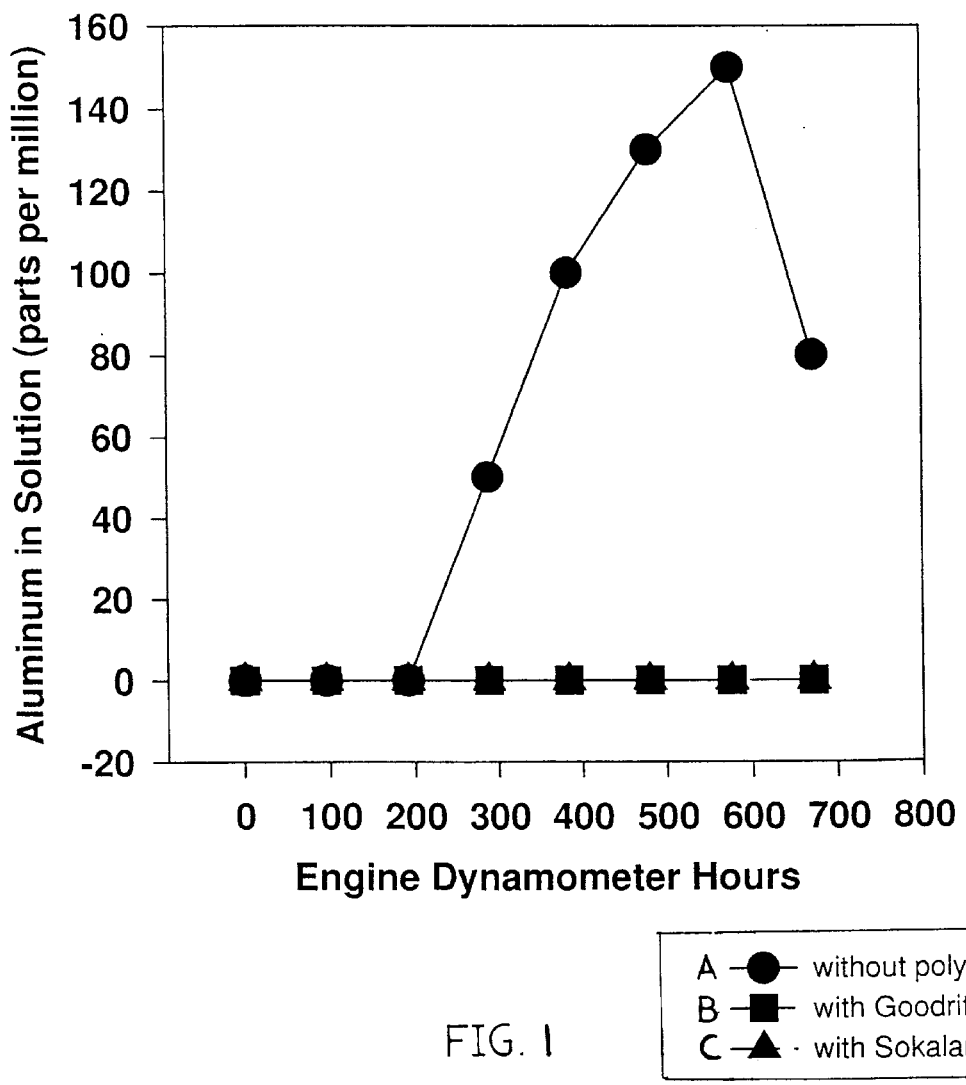
FIG. 1 is a graph of showing ALUMINUM CORROSION results from Aluminum in Solution versus Engine Dynamometer Hours for an antifreeze solution without a polycarboxylate additive, with a GOOD-RITES K-752 polycarboxylate additive, and with SOKALAN® CP-12s polycarboxylate additive.

The present invention provides long life corrosion inhibition antifreeze/coolant compositions by using certain polymeric polycarboxylate additives in a synergistic combination with stabilized silicate ("siloxane"), and other selected compounds which reduce coolant cavitation erosion-corrosion, heat rejecting aluminum corrosion, and hard water precipitates and scale. Moreover, it has been discovered that polymeric polycarboxylates enhance secondary silicate stabilization leading to improvement in aluminum corrosion protection and prolonged coolant life as compared to conventional silicon based coolants. In addition, the present corrosion inhibition formulations are effective in reducing corrosion in the entire range of cooling system metals, including heat rejecting aluminum, aluminum alloys, copper, steel, cast iron, brass, solder and the like. This formulation is soluble in alcohol, alcohol/water mixtures and in water alone and exhibits excellent stability characteristics.

The most preferred antifreeze/coolant composition is a silicate-phosphate type having a pH of about 10.5 and having about 94% antifreeze grade glycols and about 3% corrosion inhibitors, with the balance being water.

The freezing point depressant utilized in the antifreeze compositions of the invention can be any suitable water-soluble liquid alcohol used heretofore in formulating antifreeze compositions. The water-soluble alcohol contains 1 to about 4 carbon atoms and 1 to about 3 hydroxy groups. Ethylene glycol is preferred as the freezing point depressant and especially the commercially available mixtures containing largely ethylene glycol and a small amount of diethylene glycol. The commercial mixture generally contains at least 85 to 95 percent by weight of ethylene glycol with the remainder being diethylene glycol and small amounts of substances which are incidentally present such as water. Other water-soluble liquid alcohol can be admixed with ethylene glycol but such mixtures usually are not preferred. Inexpensive commercially available water soluble alcohols can also be used such as methyl, ethyl, propyl, and isopropyl alcohol alone or in mixtures.

The concentrated corrosion inhibitor formulations of the present invention is a water-based mixture of polymeric polycarboxylates, nitrate salts, phosphate, azoles, stabilized silicates and transition metal compounds. Optionally, other components including defoamers, dyes, battering agents, biocides, and the like may be added to the present formulation. Although a water soluble phosphate level is given on the basis of hydrogen phosphate, alkali metal salts are typically used. Alkaline earth or ammonium slats are also possible alone or in combination therewith. Nitrate is typically introduced as an alkali salt although acid, alkaline earth or ammonium salts could be utilized including potassium, sodium or salts alone or in combinations therewith. The azoles include tolytriazole, benzotriazole, mercaptobenzothizole including mixtures and other substituted azoles. Stabilized silicate, typically referred to as siloxane compounds, are of the type described in U.S. Pat. Nos. 4,354,002, 4,362,644, and/or 4,370,255, hereby incorporated by reference. Suitable defoamers include PLURONIC® L-61, PATCOTE® 415 and other surfactants including silicone types. The synergistic combination of phosphate, molybdate and stabilized silicate is described in U.S. Pat. Nos. 4,548,787, 4,707,286, and 4,440,721, hereby incorporated by reference.

It is contemplated that in addition to silicate-phosphate type coolants, these additives are useful in silicate-borax, silicate phosphate and borax coolants, organic acid, and organic acid silicate hybrid type coolants, and the like. The corrosion inhibitor formulations are compatible with other commonly used antifreeze/coolant components and are effective at relatively low concentrations.

Each of the preferred ingredients of the synergistic antifreeze formulation, whether mandatory or optional, is discussed below:

Polycarboxylates

The preferred class of stabilizing polymeric polycarboxylates are based on polyacrylic acid (PAA) and/or polymaleic acid (PMA). These polymeric polycarboxylates are compatible with other components in the typical antifreeze/coolant composition, and present no additional toxicity or disposal concerns. The molecular weight distribution of useful materials may average about one hundred grams/mole to about three million grams/mole. Chemically, the materials should be based on polymers and copolymers of acrylic acid and/or maleic acid, including any modifiers, such as alcohols.

The polycarboxylates used in the present invention have a molecular weight range of from about 1,200 to about 250,000, with a preferred range of from 500 to 12,000. More specifically, the most preferred additives have average molecular weights in the range of about 500 to about 4,000, and more specifically about 1300 to about 1800 and about 300 to about 4600.

When reference is made to polycarboxylates within the context of the present invention it is understood to encompass those water-soluble homo- and copolymers having at least one monomeric unit containing $C_{3-6}$ monoethylenically unsaturated mono- or dicarboxylic acids or their salts. Suitable monocarboxylic acids of this type are for example, acrylic acid, methacrylic acid, ethacrylic acid, vinylacetic acid, allylacetic acid, and crotonic acid. The preferable monocarboxylic acids from this group are acrylic acid and methacrylic acid. A further component of the polycarboxylate comprises monoethylenically unsaturated $C_{4-6}$ dicarboxylic acids, for example, maleic acid, itaconic acid, citraconic acid, mesaconic acid, fumaric acid, or methylenemalonic acid. The preferred acid is maleic acid.

Other organic substituents may-be used as co-monomers or as modifiers added along the polymer chain. Examples of such are shown as Formula I.

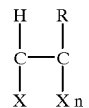

(I)

where R=H or a secondary alcohol such as isopropanol, X=COOH, COO—Na+, methylvinylether, isobutylene, vinyl acetate, acrylamide, or styrene, with the proviso that when R=a secondary alcohol, X=COOH or COO—Na+, and when X=any other above referenced group, R=H. The preferred polycarboxylates are a copolymer of acrylic acid and maleic acid, or their sodium salts, said copolymer having a molecular weight of 3000, and a sodium salt of polyacrylic acid modified with a secondary alcohol such as isopropanol, said polymer having a molecular weight of 4000.

The polycarboxylates used in the present invention are obtained by methods well known to those skilled in the art. The general method of synthesis is via free acid radical polymerization. The polymerization may be carried out in an aqueous medium, in the presence of polymerization initiators, with or without regulants. The polymerization can take various forms; for example, the monomer(s) can be polymerized batchwise in the form of aqueous solutions. It is also possible to introduce into the polymerization reactor a portion of the monomer(s) and a portion of the initiator, to heat the mixture in an inert atmosphere to the polymerization temperature and then to add the remaining monomer(s) and initiator to the reactor at the rate of polymerization. Polymerization temperatures range from 20° C. to 200° C. At temperatures above 100° C., pressure vessels are employed.

The carboxyl containing monomers can be polymerized in the free carboxylic acid form, in the partial neutralized form, or completely neutralized. The neutralization is preferably effected with alkali metal or ammonium base.

The polymerization initiators used are preferably water soluble free radical formers such as hydrogen peroxide, peroxodisulfates and mixtures of the two. The polymerization may also be started with water insoluble initiators such as dibenzoyl peroxide, dilaurylperoxide, or azodiisobutyronitrile. The polymerization may be carried out in the presence of regulants. Examples of such regulants include water soluble mercaptans, ammonium formate, and hydroxylammonium sulfate.

Polymeric polycarboxylate materials which are useful in the present invention include Belclene water treatment additives from CIBA-GEIGY®, Colloid additives from COLLOIDS®, Inc., GOOD-RITE® polyacrylates and CARBOPOL® resins from BF GOODRICH® and the like.

Examples of the polycarboxylates which may be used in the present invention are those marketed by BASF® under the trademark SOKALAN® polycarboxylates, which are available in aqueous polymer solutions. More particularly, the SOKALAN® polyacrylic dispersants are copolymer carboxylate dispersants. These SOKALAN® polycarboxylates are acrylic/maleic copolymers and other copolymers of either maleic or acrylic acid. These polycarboxylates are generally fully neutralized. The suffix "S" is a designation used to indicate free acids in the SOKALAN® range.

While particularly preferred additive, SOKALAN® CP10, CP10s, or CP12s, has been shown to be particularly effective at about 0.05 to about 0.20 weight percent in one inhibitor concentrate, other levels of additive and different polycarboxylates may also be used. SOKALAN® 10 has an average relative molecular weight of about 4,000, and comprises a secondary alcohol modified polyacrylic acids; whereas SOKALAN® 12 has an average relative molecular weight of about 3,000 and comprises a sodium salt of a copolymer of acrylic acid and maleic acid. The polymeric polycarboxylate is preferably present in the formulation in an amount of about 0.001 to about 10.0 percent by weight, and more preferably in an amount of about 0.01 to about 0.1 percent by weight. The polymeric polycarboxylate is effective at enhancing stability at relatively low concentrations, generally about 100 to about 1000 ppm per total volume of inhibitor concentrate.

The most preferred polycarboxylates are the K-700 polyacrylate polymers from BF GOODRICH® which include the GOOD-RITE® K-732 AND GOOD-RITE® K-752 polyacrylate polymers. Both are mixtures of sodium polyacrylate and polyacrylic acid in water as set forth and described in the copies of the Material Safety Data sheets as set forth in the Information Disclosure Document and incorporated by reference herewith. These polymers are similar, while differentiated by their molecular weight.

The GOOD-RITE® K-752 polyacrylate is a water soluble acrylic acid polymer supplied as a clear to hazy, colorless to amber colored, and ranging from about 62% to about 64% total solids solution in water averaging about 63%, with the active solids being about 62.5% having a specific gravity of about 1.23. The molecular weight (GPC $M_w$) is about 2100. The pH ranges from about 2.2 to 3.0 and averages about 2.6. Viscosity (CP at 25° C.) ranges from between about 400 to about 1,400, and averages about 950.

The GOOD-RITE® K-732 polyacrylate is a water soluble acrylic acid polymer supplied as a clear to hazy, colorless to amber colored, and ranging from about 49% to about 51% total solids solution in water and averaging about 50%, with the active solids being about 49.5% having a specific gravity of about 1.2. The molecular weight (GPC $M_w$) is about 5,100. The pH ranges from about 2.2 to 3.0 and averages about 2.6. Viscosity (CP at 25° C.) ranges from between about 250 to about 500, and averages about 350.

Combinations of the polycarboxylates may also be utilized in the present invention such as a mixture of a secondary alcohol modified polyacrylic acid, a sodium salt of a copolymer of acrylic acid and maleic acid and/or mixtures of sodium polyacrylate and polyacrylic acid in water. These combinations having a molecular weight of less than 10,000 are deemed to be suitable polycarboxylate additives.

Salt Corrosion Inhibitors (Nitrates)

Where the aqueous liquids contact other metals in addition to aluminum, including aluminum water pumps, metal salt corrosion inhibitors, preferably alkali metal salts known in the prior art can be usefully added to the aqueous liquids or the invention. Such known corrosion inhibitors include the water-soluble nitrates, nitrites, silicates, carbonates, sodium silicate, sodium nitrate, potassium carbonate, ammonium silicate.

Preferably, a nitrate is used in the preferred composition. The source of nitrate ion can be any water-soluble nitrate such as the alkali metal nitrates. Nitrate salts suitable in the present invention include, sodium nitrate, potassium nitrate, magnesium nitrate, calcium nitrate, lithium nitrate, mixtures thereof and the like. Any compatible salt may be used including sodium, potassium, lithium, magnesium, calcium and the like. The most preferred nitrate salt is sodium nitrate. Other equivalent methods of supplying nitrate may be used. For example, the pH of the total composition may be adjusted by addition of nitric acid ions. The reaction of nitrate acid and basic salts contained in the composition will result in liberation of free carboxylic acid and the formation of nitrate salts.

Nitrate salts serve to inhibit corrosion in the formulations of the present invention. The nitrate salt is preferably present in the formulation in an amount of about 0 to about 10.0 percent by weight, and more preferably in an amount of about 0.1 to about 1.0 percent by weight.

Azole Additives

Azoles are present in the formulation to inhibit corrosion of yellow metal like copper and brass. Brass thermostats and radiator caps are common as well as copper and brass radiators. The azole compound providing protection for copper and brass from corrosion is selected from among the water-soluble triazoles, pyrazoles, imidazoles, isooxazoles, isothiazoles, thiazoles, thiadiazole salts, and the like. Generally, the alkali metal salts are used. Specific preferred azole compounds include 1, 2, 3-benzotriazole; 1, 2, 3-tolyltriazole; sodium 2-mercaptobenzothiazole; and sodium 2-mercaptobenzimidazole. Azole compounds suitable in the present invention include, salts of mercaptobenzothiazole, salts of tolytriazole, benzotriazole, mixtures thereof and the like. Typically, these azoles are preferably present in a fifty percent concentration. However, one preferred azole compound consists of the salts of mercaptobenzothiazole and salts of tolytriazole. More particularly, one preferred azole compound is a mixture of sodium mercaptobenzothiazole and sodium tolytriazole which may be used in about a 3 to 1 ratio.

The azoles are preferably present in the formulation in an amount of about 0.01 to about 10.0 percent by weight, and more preferably in an amount of about 0.05 to about 1.0 percent by weight. Generally, the azole compound is used in amounts of about 0.1 parts to about 0.5 parts by weight, preferably about 0.1 to about 0.4 parts by weight, based on 100 parts by weight of the aqueous liquid.

Molybdate Additives

The water-soluble molybdate which is preferred for use in the aqueous systems of the present invention can be any salt of molybdic acid which is readily soluble in water. These include both alkali metal and alkaline earth metal molybdates as well as ammonium molybdate, the term "alkali molybdate" being used in a broad sense so as to include alkali metal, alkaline earth metal and ammonium molybdates. Examples of useful molybdates are sodium molybdate, potassium molybdate, lithium molybdate and ammonium molybdates including ammonium dimolybdate and ammonium heptamolybdate. Alkali molybdate compounds, sodium molybdate and potassium molybdate are preferred because of their availability and compatibility with the aqueous system as well as for economic reasons. The specific concentration of the molybdate ion will vary depending upon the degree of hardness of the aqueous system, the temperature, and the amount of dissolved oxygen in the aqueous system. While concentrations of the molybdate ion above about 0.5 parts by weight per 100 parts by weight of aqueous liquid can be employed. In most instances concentrations of molybdate ion above this limit normally do not provide significant improvements in the inhibitive characteristics or the aqueous system and are undesirable for economic reasons.

Transition metal compounds suitable for use in the present invention include, disodium salt dehydrate of molybdic acid, sodium molybdate $2H_2O$, molybdenum trioxide, silicoheteropolymolybdates, phosphoroheteropolymolybdates, mixtures thereof and the like. Any compatible transition metal may be used, including for example, molybdate, cobalt, cerium, mixtures thereof and the like. In addition, any acid salt may be used including sodium, potassium, lithium, calcium, magnesium and the like. The most preferred transition metal compound is the disodium salt dehydrate of molybdic acid or sodium molybdate $2H_2O$.

Transition metal acids are used to inhibit corrosion in formulations of the present invention. The transition metal compound is preferably present in the formulation in an amount of about 0.001 to about 10.0 percent by weight, and more preferably in an amount of about 0.01 to about 0.1 percent by weight. The molybdate ion is employed in amounts so as to provide a concentration in the aqueous system of at least about 0.001 parts by weight per 100 parts by weight of aqueous liquid. Preferably about 0.005 to about 0.1 parts by weight per 100 parts by weight of molybdate based upon said aqueous liquid are employed.

Phosphorus Additives

Both inorganic and organic water-soluble phosphorus compounds are useful in inhibiting the cavitation erosion corrosion of aluminum in contact with aqueous liquids. The water-soluble phosphates are used generally in amounts so as to provide a concentration of about 0.5 to about 2 parts by weight per 100 parts by weight of the aqueous liquid. These compounds include the preferred water-soluble alkali metal salts of orthophosphoric acid, pyrophosphoric acid, and metaphosphoric acid. Orthophosphoric acid being tri-basic forms three series of salts, potassium dihydrogen phosphate, disodium hydrogen phosphate, and trisodium phosphate. Useful organic phosphates include the oxyesters of phosphoric acid, as well as the amides and triesters thereof. The most common phosphorus acid esters which are useful are the mono-, di-, and trimesters of orthophosphoric acid. These can be alkyl phosphates, aryl phosphates and mixed alkyl-aryl phosphates. Representative alkyl groups having 1 to about 18 carbon atoms which can be present in the alkyl phosphates include methyl, ethyl, propyl, isopropyl and n-butyl, isobutyl, etc. Representative substituted alkyl groups which can be present in the phosphorus esters include said alkyl groups substituted with halogen, especially chlorine and fluorine, and with alkoxy groups. Examples of substituted alkyl groups include butoxyethyl, 2-chloroethyl, 2-nuoroethyl, etc. Examples or other groups which can be present in the phosphorus esters include alkyl groups substituted with halogen, especially chlorine and fluorine, and with alkoxy groups. Examples of substituted alkyl groups include butyoxycthyl, 2-chloroethyl, 2-fluoroethyl, etc. Examples of aryl groups which can be present in the phosphorus esters include phenyl, xylyl, cresyl and halogenated phenyl.

Phosphates suitable in the present invention include, dipotassium phosphate, disodium phosphate, monopotassium phosphate, tripotassium phosphate, monosodium phosphate, trisodium phosphate, mixtures thereof and the like. Any compatible salt may be used including sodium, potassium, lithium, and the like. The most preferred phosphate is a dipotassium phosphate. The phosphates are preferably present in a fifty percent solution.

Phosphates serve to buffer and inhibit corrosion in the formulations of the present invention. The phosphate is preferably present in the formulation as fifty percent dipotassium phosphate in an amount of about 0.1 to about 10.0 percent by weight, and more preferably in an amount of about 1.0 to about 4.0 percent by weight.

Siloxane-silicate Copolymers

The phosphonate and sulfonate siloxane-silicate copolymers can be formed in situ upon combination of a water-soluble silicate and a water-soluble siloxane. In the preferred composition, the silicone-silicate copolymer is selected from the group comprising alkali siliconate silylalkylphosphonates and salts thereof, arylalkyl silicone sulfonate-silicates and salts thereof, and sulfosiloxane-silicates and salts thereof and/or mixtures thereof. These copolymers are believed to provide improved metal corrosion inhibition over the use of the water-soluble silicates. The stabilized silicate, ("siloxane copolymers"), substantially inhibit the gelation tendency of a water-soluble silicate at a pH of about 7 to about 11. The anticorrosive activity of the soluble silicate is maintained in the copolymer as compared to an ordinary unstabilized soluble silicate such as sodium silicate. The stabilized silicone/silicate technology is disclosed in U.S. Pat. Nos. 4,370,255; 4,362,644; and 4,354,002, all hereby incorporated by reference. Other siloxane-silicate copolymers can be utilized in combination with the water-soluble molybdates and the water-soluble salts and esters of phosphorus acids. These are disclosed in U.S. Pat. Nos. 3,341,469; 3,337,496; 3,312,622; 3,198,820; 3,203,969; 3,248,329; and 4,093,641 all incorporated herein by reference.

Silicone/silicates are used to inhibit corrosion in the formulation of the present invention. The silicone silicates are preferably present in the formulation in an amount of about 0.1 to about 10.0 percent by weight, and more preferably in an amount of about 0.2 to about 1.0 percent by weight.

Defoamers

Any suitable defoamer, well known in the art, is suitable for the present formulations. Suitable defoamers include, for example, PLURONIC® L-61 non-ionic surfactant (commercially available from BASF® Corporation) or PAT-COTE® 415 liquid defoamer (commercially available from Patco Specialty Chemicals Division, American Ingredients Company). The defoamer may be present in an amount up to about 10.0 percent by weight and more preferably present in an amount of about 0.001 to about 10.0 percent by weight, and most preferably, in an amount of about 0.01 to about 0.05 percent by weight.

Additives

Other additives such as bittering agents, dyes, or biocides may be added to the antifreeze/coolant solution.

Synergistic Effect

The above synergistic combination of selected polycarboxylates and stabilized silicates ("siloxane"), in combination with inhibitors is particularly suited for the corrosion protection of aluminum in contact with an aqueous system so as to provide protection against cavitation-erosion corrosion or aluminum water pumps in a long life antifreeze composition providing additional protection as compared to other silicate and stabilized silicate based compositions without the addition of polycarboxylates. Other corrosion inhibitors are optionally added to the aqueous liquid exhibiting synergy together and in combination with the siloxane/polycarboxylate components.

The synergistic combination of corrosion inhibitors useful in inhibiting the cavitation-erosion corrosion of aluminum water pumps is generally effective in a basic aqueous corrosive media. For instance, the corrosion inhibitors of the invention are useful in aqueous alcohol based antifreeze compositions which are generally maintained at a pH of at least 6, and preferably about 7 to about 11. The corrosion inhibitors of the invention are also useful in best transfer media utilized in cooling towers.

The antifreeze concentrates of the invention are prepared by first dissolving in a water-alcohol blend (preferably ethylene glycol in combination with diethylene glycol) a water-soluble silicate, an organosiloxane, preferably a phosphonate siloxane, or a sulfonate siloxane, and an alkali metal molybdate, tungstate or selenate. Subsequently the composition is rendered basic by the addition of sodium or potassium hydroxide. Where protection against the corrosion of copper and copper-containing alloys is also required in addition to aluminum in contact with the aqueous antifreeze concentrates of the invention, an alkali metal azole such as potassium mercaptobenzothiozole or sodium tolyltriazole is then generally added as a 50 percent aqueous solution. Optionally, an antifoam agent is used which can be a low-foaming polyoxyethylene adduct of a polyoxypropylene hydrophobic base having a molecular weight of about 1750 wherein the oxycthylene content is about 10 weight percent of the molecule. Additional low-foaming nonionic surface active agents can be used which are disclosed in U.S. Pat. Nos. 3,340,309; 3,504,041; 3,770,701; and 2.425,755. The disclosures of low-foaming nonionic surface active agents in the above-mentioned U.S. patents are incorporated herein by reference. The resultant antifreeze concentrate composition can be diluted with water in accordance with prior a practice to produce an antifreeze fluid or heat transfer medium having be desired freezing point. As a general rule, the antifreeze concentrate used to prepare the coolant can be diluted with about 1 to about 3 volume of water to arrive at the coolant fluid which is circulated in the engine cooling system or in a cooling tower. Smaller or larger quantities of water can be added as necessary to void the freezing of the coolant.

In order to obtain the desired resistance to cavitation erosion corrosion of aluminum water pumps in contact with aqueous liquids containing a siloxane-silicate co-polymer metal corrosion inhibitor, it is necessary to provide the required amounts of phosphate and at least one of a molybdate, tungstate, or selenate in the amounts specified above.

Experimental Evaluation

The following examples serve to further illustrate the present invention and should in no way be construed as limiting the scope thereof.

The ASTM D-1384-87 test was used to evaluate the corrosion inhibitor formulations of the present invention. ASTM D-1384-87 is the standard test method for corrosion testing of engine coolants in glassware and simulates the some world operating conditions of cooling systems.

The ASTM D-2570 test was used to evaluate the corrosion inhibitor formulations of the present invention. ASTM D-2570 is the standard test method for simulated service testing of engine coolants in glassware and better simulates the real world operating conditions of cooling systems than the D-1384-87 test.

Formulations used in the following Examples (1-4) are presented in Table 1.

TABLE 1

(Formulations)
Composition A (without polycarboxylate)
Composition B (with GOOD-RITE ® K752 polycarboxylate)
Composition C (with SOKALAN ® CP-12s polycarboxylate)

| FORMULATION COMPONENTS (wt %) | Composition A | Composition B | Composition C |
|---|---|---|---|
| Distilled Water | 1.2 | 0.1 | 0.1 |
| Ethylene Glycol | Balance | Balance | Balance |
| Water Soluble Nitrates | 0.13 | 0.15 | 0.15 |
| Water Soluble Phosphates | 1.9 | 2.0 | 2.0 |
| 50% Na MercaptoBenzothiazole and/or 50% Na Tolytriazole (Azoles) and/or Benzotriazole | 0.1 | 0.1 | 0.i |
| Water Soluble Molybdates | 0.004 | 0.004 | 0.004 |
| Siloxane Stabilized Silicate Mixture | 0.2 | 0.2 | 0.2 |
| 50% NaOH (caustic to pH) | 10 min. | 10 min. | 10 min. |
| SOKALAN ® CP-12s polycarboxylate | 0.000 | 0.000 | 0.020 |
| GOOD-RITE ® K-752 | 0.000 | 0.008 | 0.000 |
| Defoamer | 0.005 | 0.005 | 0.005 |

The temperature, test duration, and metal specimen cleaning procedures were all conducted according to ASTM D-1384-87 specifications. All weight changes are in milligrams per specimen (mg/specimen). A negative weight loss is a weight gain. The passing specification refers to weight loss.

TABLE 2

(ASTM D-1384 Weight Loss in Mg/Specimen)

| Metal Coupon | Spec. to Pass | Composition A | Composition B | Composition C |
|---|---|---|---|---|
| Copper | 10 | 0.9 | −0.7 | 0.6 |
| 70/30 Solder | 30 | 0.9 | 6.7 | −0.7 |
| Brass | 10 | 1.3 | −1.5 | 2.8 |
| Mild Steel | 10 | 0.5 | 0.4 | 0.4 |
| Cast Iron | 10 | 5.5 | 3.5 | 6.9 |
| Aluminum | 30 | −4.7 | −23.4 | −8.5 |
| TEST RESULT | | PASS | PASS | PASS |

The results from Table 2 show that Formulations A, B, and position C passed the ASTM D-1384 weight loss tests.

TABLE 3

| Metal Coupon | Spec. To Pass | Composition A | Composition B | Composition C |
|---|---|---|---|---|
| Copper | 20 | 3.2 | 2.3 | 2.4 |
| 70/30 Solder | 60 | 0.6 | 0.8 | 57.6 |
| Brass | 20 | 17.4 | 4.6 | 5.7 |
| Mild Steel | 20 | −0.5 | −0.1 | 1.5 |
| Cast Iron | 20 | 2.2 | −0.1 | 1.4 |

TABLE 3-continued

| Metal Coupon | Spec. To Pass | Composition A | Composition B | Composition C |
| --- | --- | --- | --- | --- |
| Aluminum TEST RESULT | 60 | 2.6 PASS | −6.7 PASS | −3.9 PASS |

The results from Table 3 show that Formulations A, B, and C passed the ASTM D-2570 simulated service weight loss tests.

Moreover, an ASTM D-4340 test was conducted which showed no difference in the corrosion rate of the compositions A, B, and C in mg/cm-cm/week as follows:

TABLE 4

| Specification | Composition A | Composition B | Composition C |
| --- | --- | --- | --- |
| 1.0 | <0.5 | <0.5 | <0.5 |

Moreover, an ASTM D-2809 test was conducted which showed very little difference in the pump cavitation rating of the compositions A, B, and C as follows:

TABLE 5

| Specification | Composition A | Composition B | Composition C |
| --- | --- | --- | --- |
| 8 | 9 | 9 | 10 |

The three coolant compositions A (without polycarboxylate), B (with GOOD-RITE® K752 polycarboxylate), and C (with SOKALAN® CP-12s polycarboxylate) were subject to the Ford engine dynamometer test, FLTM BL 2-2. The test involves a four cylinder OHC engine operating at 2400 RPM, 83 Nm torque 28 (bhp). The coolant temperature is 107 +/±° C., and the drop across the radiator is 20 +/−° C. The test duration is sixteen (16) hours on and eight (8) hours off per day for forty-two (42) operating days (672 hours). At ninety-six (96) hour intervals the coolant is sampled and analyzed chemically and physically.

EXAMPLES

The following examples serve to further illustrate the present invention and should in no way be construed as limiting the scope thereof.

Example 1

As shown in FIG. 1, the polymeric polycarboxylate containing coolant compositions B (with GOOD-RITE® K752 polycarboxylate), and C (with SOKALAN® CP-12s polycarboxylate) completed the Ford engine dynamometer FLTM BL 2-2 test with satisfactory aluminum corrosion results. Coolant Composition A (without the polycarboxylate) did not pass the test. After 200 hours aluminum corrosion begins for the specimen in Composition A. The corrosion of aluminum resulted in 160 ppm aluminum in solution after 600 hours. No aluminum or corrosion products in solution were observed for Compositions (B and C).

Example 2

Figure 2:
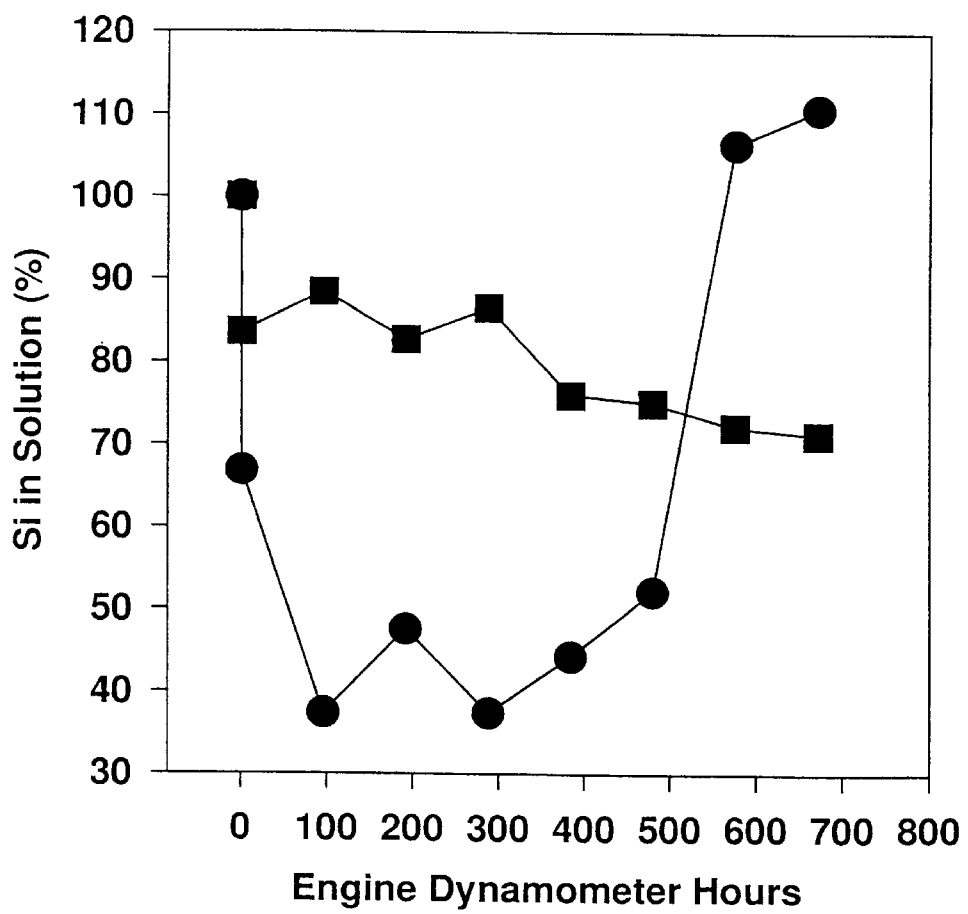
FIG. 2 is a graph showing the EFFECT OF POLYCARBOXYLATE based on the percent of Silicon in Solution versus Engine Dynamometer Hours for an antifreeze solution without a polycarboxylate additive and with a GOOD-RITE® K-752 polycarboxylate additive.

FIG. 2 shows the percent silicate in solution for Composition A (without the polycarboxylate) vs. Composition B (with GOOD-RITE® K752 polycarboxylate) as a function of the addition of the polycarboxylate, specifically the GOOD-RITE® K752 in combination with the stabilized siloxane silicate and other synergistically acting components including the water soluble nitrate, water soluble phosphates, azole compound, water soluble molybdate, sodium hydroxide in the glycol solution. As shown in the Ford engine dynamometer FLTM BL 2-2 test, the silicate level drops precipitously for Composition A without the selected polycarboxylate additive. At 100 hours the silicate level of Composition A is less than 40% of the initial value. It should be noted that the silicate level of Composition A increases near the end of the test. It is our theory that the increase is due to corrosion of the silicon containing aluminum engine alloy. Composition B containing the selected GOOD-RITE® K752 polycarboxylate and stabilized silicate "siloxane" compound shows a relatively constant rate of depletion for silicate, yet a sufficient amount of silicate is maintained in solution for the duration of the test. These results show that at highway speeds, coolant Composition A should be changed after 13,000 miles, whereas Coolant Composition B protects the engine in excess of 40,000 miles. This is based on an estimated speed of 65–75 mile per hour.

Example 3

Figure 3:
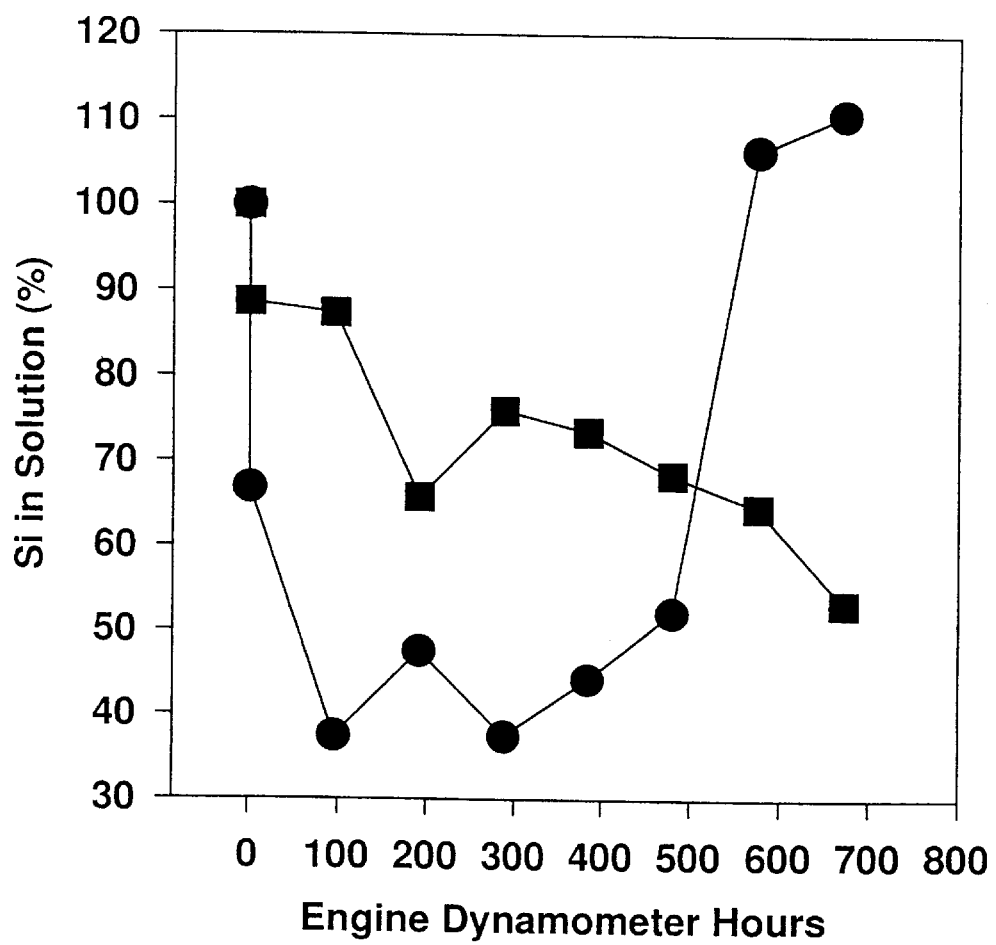
FIG. 3 is a graph showing the EFFECT OF POLYCARBOXYLATE based on the percent of Silicon in Solution versus Engine Dynamometer Hours for an antifreeze solution without a polycarboxylate additive and with a SOKALAN® CP-12s polycarboxylate additive.

FIG. 3 shows the effect of adding Composition C (with SOKALAN® CP-12s polycarboxylate) to the antifreeze solution used in combination with the stabilized siloxane silicate and other synergistically acting components including the water soluble nitrate, water soluble phosphates, azole compound, water soluble molybdate, sodium hydroxide in the glycol solution. In a similar manner as shown in FIG. 1 in the Ford engine dynamometer FLTM BL 2-2 test, when utilizing Composition B (with GOOD-RITE® K752 polycarboxylate), Composition C (with SOKALAN® CP12s polycarboxylate) retards silicate depletion for the duration of the standard 672 hour test. Moreover, when this test was extended to 1064 hours, more than 50% of the silicate remained in solution without exhibiting any aluminum corrosion products in solution, which is equivalent to approximately 70,000 highway miles.

Example 4

Figure 4:
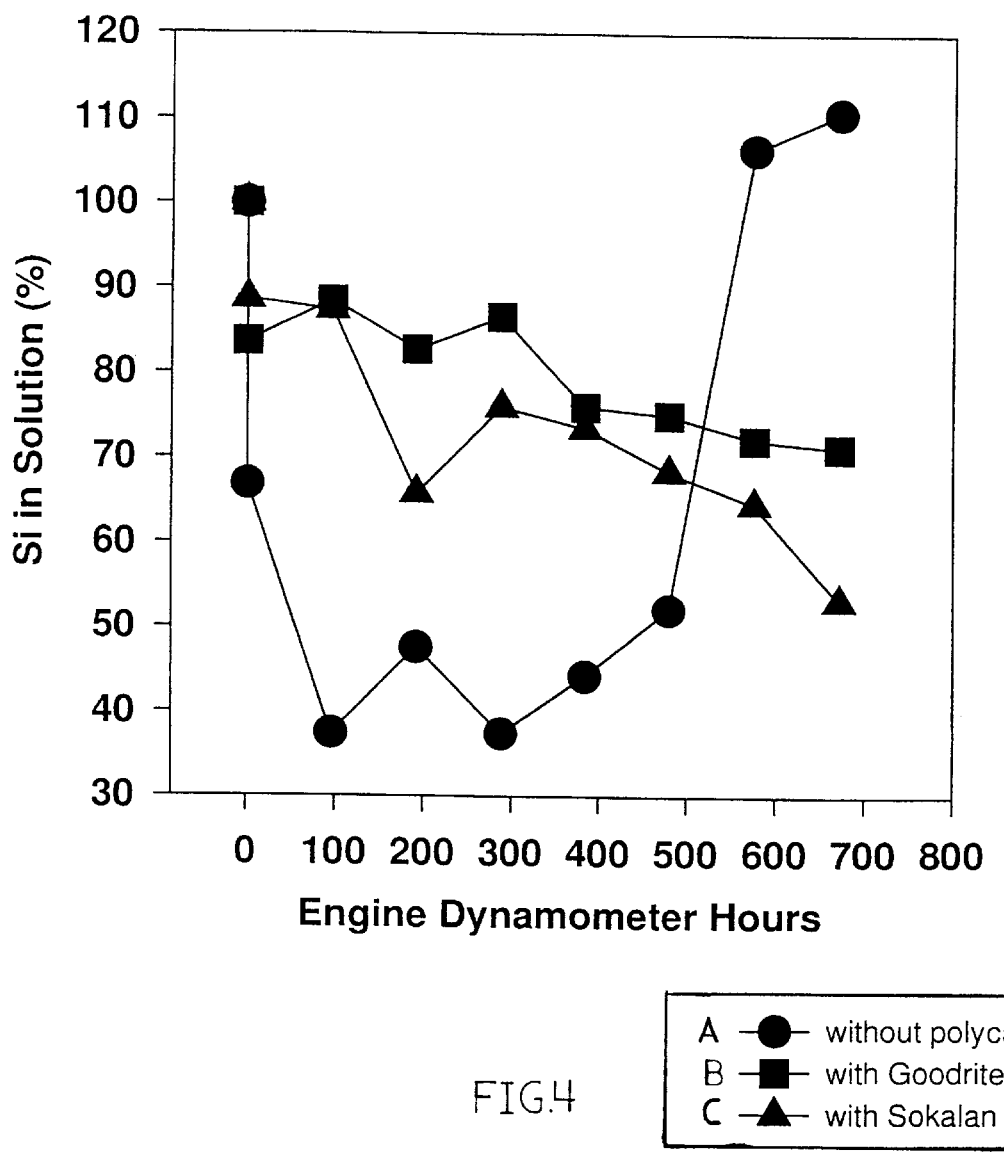
FIG. 4 is a graph showing the EFFECT OF POLYCARBOXYLATE based on the percent of Silicon in Solution versus Engine Dynamometer Hours for an antifreeze solution without a polycarboxylate additive, with a GOOD-RITE® K-752 polycarboxylate additive, and with a SOKALAN® CP-12s polycarboxylate additive.

FIG. 4 compares all three compositions, Composition A (without polycarboxylates), Composition B (with the GOOD-RITE® K752 polycarboxylate), and Composition C (with the SOKALAN® CP-12s polycarboxylate), wherein Compositions B and C enhance the siloxane silicate stability of the coolant products especially in combination with the other synergistically acting components. FIG. 4 shows that while both Composition C (with SOKALAN® CP-12s polycarboxylates) and Composition B (with GOOD-RITE® K752 polycarboxylates) enhance silicate stability, the Composition B (with GOOD-RITE® K752 polycarboxylate) solution is more efficient in that it is 2.5 times lower in concentration that Composition C (with SOKALAN® CP-12s polycarboxylate) solution, yet the rate of silicate depletion is lower. Extrapolation to 50% silicate content suggests a lifetime in excess of 100,000 highway speed miles for using the Composition B (with GOOD-RITE® K752 polycarboxylate) in combination with the siloxane stabilized silicate suggesting a synergy which heretofore has not been realized with other stabilized silicate compositions alone or in combination with other components acting synergistically therewith to product a long life antifreeze composition.

The complete disclosure of each U.S. Patent cited anywhere hereinabove is incorporated herein by reference as if fully set forth in this specification.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented hereinabove. Rather, what is intended to be covered is within the spirit and scope of the appended claims.

We claim:

1. An antifreeze/coolant solution for inhibiting the corrosion of metals and inhibiting mineral scale based on 100 parts by weight of said glycol-based solution, comprising:
   a polymeric polycarboxylate which is at least one selected from the group consisting of (i) a polyacrylic acid, (ii) a sodium salt of a polyacrylic acid, and (iii) a combination thereof, in an amount of from about 0.001 to 10.0 percent by weight;
   a nitrate salt selected from the group consisting of sodium nitrate, potassium nitrate, magnesium nitrate, calcium nitrate, lithium nitrate and combinations thereof in an amount of about 0.10 to about 10.0 percent by weight;
   an azole compound selected from the group consisting of sodium mercaptobenzothiazole, sodium tolytriazole, water-soluble triazoles, pyrazoles, imidazoles, isooxazoles, isothiazoles, thiazoles, thiadiazole, 1, 2, 3-benzotriazole, 1,2,3-tolyltriazole, sodium 2-mercaptobenzothiazole, and sodium 2-mercaptobenzisidazole in an amount of about 0.01 to about 10.0 percent by weight;
   a silicone-silicate copolymer in an amount of about 0.1 to about 10.0 percent by weight;
   a phosphate salt which is selected from the group consisting of dipotassium phosphate, disodium phosphate, monopotassium phosphate, tripotassium phosphate, monosodium phosphate, trisodium phosphate, and mixtures thereof in an amount of from about 0.1 to about 10.0 percent by weight;
   a transition metal compound selected from the group consisting of disodium salt dihydrate of molybdic acid, molybdenum trioxide, silicoheteropolymolybdates and/or phosphoroheteropolymolybdates, sodium molybdate, potassium molybdate, lithium molybdate, ammonium molybdate, ammonium dimolybdate, and ammonium heptamolybdate in an amount of about 0.001 to about 10.0 percent by weight; and
   a glycol compound selected from the group consisting of ethylene glycol, diethylene glycol, propylene glycol, methyl alcohol, ethyl alcohol, propyl alcohol, isopropyl alcohol and combinations thereof making up the balance of the solution.

2. The antifreeze/coolant solution of claim 1, wherein said polymeric polycarboxylate has a molecular weight in a range of between about 500 to 5,100.

3. The antifreeze/coolant solution of claim 1, wherein said polymeric polycarboxylate has a molecular weight in a range of between about 500 to 12,000.

4. The antifreeze/coolant solution of claim 1, wherein said polymeric polycarboxylate has a molecular weight in a range of between about 500 to 1,800.

5. The antifreeze/coolant solution of claim 1, wherein said azole compound is a mixture of sodium mercaptobenzothiazole and sodium tolytriazole.

6. The antifreeze/coolant solution of claim 5, wherein said sodium mercaptobenzothiazole and sodium tolytriazole are present in about a 3 to 1 ratio.

7. The antifreeze/coolant solution of claim 1, wherein said azole compound is present in about a 50% concentration.

8. The antifreeze/coolant solution of claim 1, wherein said nitrate salt is sodium nitrate.

9. The antifreeze/coolant solution of claim 8, wherein said nitrate salt is present in an amount between about 1 wt % to about 3 wt %.

10. The antifreeze/coolant solution of claim 1, wherein said phosphate salt is a dipotassium phosphate.

11. The antifreeze/coolant solution of claim 1, wherein said phosphate salt is present in about a 50% solution.

12. The antifreeze/coolant solution of claim 1, wherein said transition metal compound is the disodium salt dihydrate of molybdic acid.

13. The antifreeze/coolant solution of claim 1, including a defoamer.

14. The antifreeze/coolant solution of claim 13, wherein said defoamer is present in an amount between about 0.001 to about 10.0 wt. %.

15. The antifreeze/coolant solution of claim 1, including a bittering agent.

16. The antifreeze/coolant solution of claim 1, including a dye.

17. The antifreeze/coolant solution of claim 1, including a biocide.

18. The antifreeze/coolant solution of claim 1, wherein said silicone-silicate copolymer is present in an amount between about 0.1 to about 6.0 wt. %.

19. The antifreeze/coolant solution of claim 1, wherein said silicone-silicate copolymer is selected from the group consisting of alkali siliconate silylalkylphosphonates and salts thereof, arylalkyl silicone sulfonate-silicates and salts thereof, and sulfosiloxane-silicates and salts thereof.

20. A glycol-based automotive antifreeze/coolant solution for inhibiting the corrosion of metals and inhibiting mineral scale said solution comprising a corrosion inhibiting effective amount of:
   a polymeric polycarboxylate which is at least one selected from the group consisting of (i) a polyacrylic acid, (ii) a sodium salt of a polyacrylic acid; and (iii) a combination thereof;
   a nitrate salt which is at least one selected from the group consisting of sodium nitrate, potassium nitrate, magnesium nitrate, calcium nitrate, lithium nitrate and combinations thereof;
   an azole compound which is selected from the group consisting of sodium mercaptobenzothiazole, sodium tolytriazole, water-soluble triazoles, pyrazoles, imidazoles, isooxazoles, isothiazoles, thiazoles, thiadiazole, 1, 2, 3-benzotriazole, 1,2,3-tolyltriazole, sodium 2-mercaptobenzothiazole, and sodium 2-mercaptobenzimidazole;
   a silicone-silicate copolymer;
   a phosphate salt which is selected from the group consisting of dipotassium phosphate, disodium phosphate, monopotassium phosphate, tripotassium phosphate, monosodium phosphate, trisodium phosphate, mixtures thereof;
   a transition metal compound selected from the group consisting of disodium salt dihydrate of molybdic acid, molybdenum trioxide, silicoheteropolymolybdates and/or phosphoroheteropolymolybdates, sodium molybdate, potassium molybdate, lithium molybdate, ammonium molybdate, ammonium dimolybdate, and ammonium heptamolybdate; and a water-soluble alcohol selected from the group consisting of ethylene glycol, diethylene glycol, propylene glycol, methyl alcohol, ethyl alcohol, propyl alcohol, isopropyl alcohol and combinations thereof making up the balance of the solution.

21. The antifreeze/coolant solution of claim 20, wherein said polymeric polycarboxylate has a molecular weight in a range of between about 500 to 4,000.

22. The antifreeze/coolant solution of claim 20, wherein said polymeric polycarboxylate has a molecular weight in a range of between about 500 to 1,800.

23. The antifreeze/coolant solution of claim 20, wherein said azole compound is a mixture of sodium mercaptobenzothiazole and sodium tolytriazole.

24. The antifreeze/coolant solution of claim 23, wherein said sodium mercaptobenzothiazole and sodium tolytriazole are present in a about a 3 to 1 ratio.

25. The antifreeze/coolant solution of claim 20, wherein said azole compound is present in a about a 50% concentration.

26. The antifreeze/coolant solution of claim 20, wherein said nitrate salt is sodium nitrate.

27. The antifreeze/coolant solution of claim 26, wherein said nitrate salt is present in an amount between about 1 wt % to about 3 wt %.

28. The antifreeze/coolant solution of claim 20, wherein said phosphate salt is a dipotassium phosphate.

29. The antifreeze/coolant solution of claim 20, wherein said phosphate salt is present in about a 50% solution.

30. The antifreeze/coolant solution of claim 20, wherein said transition metal compound is the disodium salt dihydrate of molybdic acid.

31. The antifreeze/coolant solution of claim 20, including a defoamer.

32. The antifreeze/coolant solution of claim 31, wherein said defoamer is present in an amount between about 0.001 to about 10.0 wt. %.

33. The antifreeze/coolant solution of claim 20, including a bittering agent.

34. The antifreeze/coolant solution of claim 20, including a dye.

35. The antifreeze/coolant solution of claim 20, including a biocide.

36. The antifreeze/coolant solution of claim 20, wherein said silicone-silicate copolymer is present in an amount between about 0.1 to about 6.0 wt. %.

37. The antifreeze/coolant solution of claim 20, wherein said silicone-silicate copolymer is selected from the group consisting of alkali siliconate silylalkylphosphonates and salts thereof, arylalkyl silicone sulfonate-silicates and salts thereof, and sulfosiloxane-silicates and salts thereof.

38. The antifreeze/coolant solution of claim 20, wherein said polymeric polycarboxylate comprises from about 0.001 to about 10.0 percent by weight.

39. The antifreeze/coolant solution of claim 20, wherein said nitrate salt comprises an amount of about 0.1 to about 10.0 percent by weight.

40. The antifreeze/coolant solution of claim 20, wherein said azole compound comprises an amount of about 0.01 to about 10.0 percent by weight.

41. The antifreeze/coolant solution of claim 20, wherein said silicone-silicate copolymer comprises an amount of about 0.1 to about 10.0 percent by weight.

42. The antifreeze/coolant solution of claim wherein said phosphate salt comprises an amount of from between about 0.1 to about 10.0 percent by weight.

43. The antifreeze/coolant solution of claim 20, wherein said transition metal compound an amount of from about 0.001 to about 10.0 percent by weight.

44. The antifreeze/coolant solution of claim 1, wherein said phosphate salt comprises an amount of between about 0.1 to about 4.0 percent by weight.

45. The antifreeze/coolant solution of claim 1, wherein said phosphate salt is a 50% dipotassium phosphate.

46. The antifreeze/coolant solution of claim 20, wherein said phosphate salt comprises an amount of between about 0.1 to about 4.0 percent by weight.

47. The antifreeze/coolant solution of claim 20, wherein said phosphate salt is a 50% dipotassium phosphate.

48. The antifreeze/coolant solution of claim 20, wherein said polymeric polycarboxylate has a molecular weight in a range of between about 500 to 12,000.

* * * * *